United States Patent Office 3,597,346
Patented Aug. 3, 1971

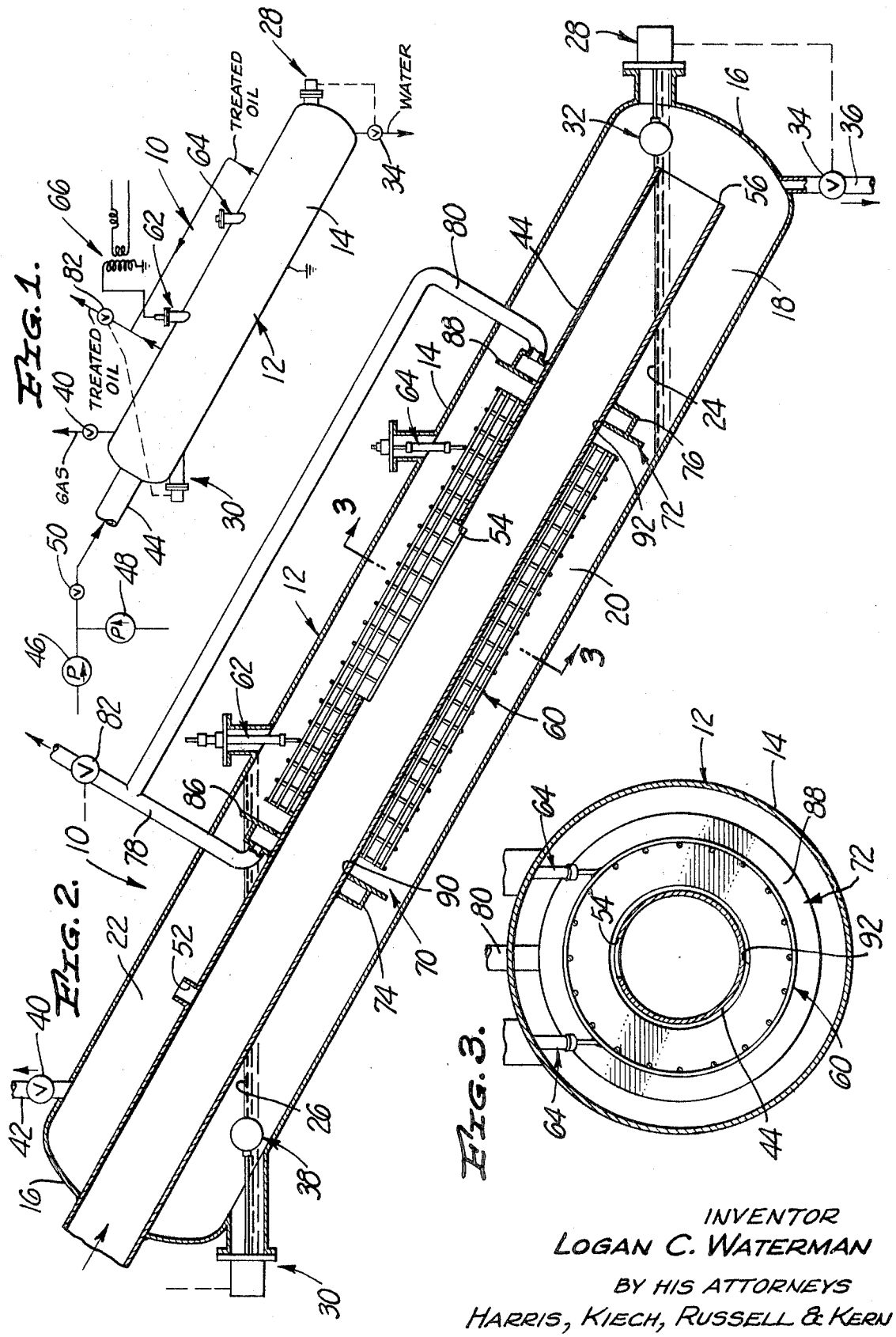

3,597,346
INCLINED, ELECTRIC WET-OIL TREATER
Logan C. Waterman, Houston, Tex., assignor to
Petrolite Corporation, St. Louis, Mo.
Filed May 7, 1969, Ser. No. 822,604
Int. Cl. B03c 5/02
U.S. Cl. 204—302
8 Claims

ABSTRACT OF THE DISCLOSURE

An inclined electric treater for water-in-oil dispersions. The treater includes: an inclined elongated container providing a water zone at its lower end, an elongated oil zone intermediate its ends and a gas zone at its upper end; a wet-oil inlet tube in and extending axially of the container and provided with a port for discharging wet oil into the annulus between the inlet tube and the container; a foraminous cylindrical electrode in the annulus between the inlet tube and the container and encircling the inlet tube so that there are electric fields between the electrode and the inlet tube as well as between the electrode and the container; and upper and lower annular dry-oil collectors encircling and carried by the inlet tube respectively adjacent the upper and lower ends of and within the oil zone, the two collectors facing each other and providing annular dry-oil outlets bounded by and encircling the inlet tube.

BACKGROUND OF INVENTION

The present invention relates in general to the electric dehydration of emulsions of the type in which the continuous phase may be any oil, such as crude oil, of relatively high resistivity. The dispersed phase is normally aqueous and may be liquid, or it may be semi-liquid and composed in part of solids. This aqueous phase may be either acidic or alkaline, and normally will have a higher electrical conductivity than the oil of the continuous phase. Emulsions or dispersions to which the invention is applicable may be naturally occurring, or they may be the result of prior processing of oils.

CROSS-REFERENCE TO RELATED APPLICATION

This application is related to my co-pending application Ser. No. 822,629, filed May 7, 1969, and entitled, "Inclined Wet-Oil Heater-Treater."

SUMMARY AND OBJECTS OF INVENTION

In general, the invention contemplates, and an object thereof is to provide, an electric treater which includes: an inclined elongated container providing a water zone at its lower end, an oil zone intermediate its ends and a gas zone at its upper end, the container being inclined at a relatively small angle to the horizontal to provide large-area interfaces between the water zone and the oil zone and between the oil zone and the gas zone; wet-oil inlet means for introducing into the container a dispersion to be resolved; an electric-field-producing means within the container for electrically resolving the dispersion. The invention further contemplates a treater of the foregoing general nature having water and gas level control means respectively maintaining a predetermined upper water level in the water zone and a predetermined lower gas level in the gas zone.

An important object of the invention is to provide an inclined, electric wet-oil treater of the foregoing character having a wet-oil inlet tube within and extending longitudinally of the container and provided with port means for discharging wet oil into the annulus between the inlet tube and the container, and further having a foraminous cylindrical electrode in the annulus between the inlet tube and the container and encircling the inlet tube, this construction providing an electric field between the electrode and the inlet tube as well as between the electrode and the circumferential wall of the container.

Another important object of the invention is to provide an annular dry-oil collector encircling the inlet tube adjacent at least the upper end of and within the oil zone. A related object is to provide upper and lower annular dry-oil collectors encircling and carried by the inlet tube respectively adjacent the upper and lower ends of and within the oil zone, and respectively facing downwardly and upwardly along the inlet tube, each providing an annular dry-oil outlet bounded by and encircling the inlet tube.

The foregoing annular dry-oil collectors damp hydraulic disturbances which might be transferred between the oil zone and the gas and water zones, and the narrow outlet annuli encircling the inlet tube promote uniform withdrawal of clean oil from throughout the oil zone and require all effluent oil to pass through the electric fields, which are important features of the invention.

The foregoing objects, advantages, features and results of the present invention, together with various other objects, advantages, features and results thereof which will be evident to those skilled in the electric treater art in the light of this disclosure, may be achieved with the exemplary embodiment of the invention described in detail hereinafter and illustrated in the accompanying drawing.

DESCRIPTION OF DRAWING

In the drawing:

FIG. 1 is a diagrammatic elevational view of an inclined, electric wet-oil treater which embodies the invention, and shows external connections thereto;

FIG. 2 is an enlarged, longitudinal sectional view of the treater shown diagrammatically in FIG. 1; and FIG. 3 is a further enlarged, transverse sectional view taken as indicated by the arrowed line 3—3 of FIG. 2.

DESCRIPTION OF EXEMPLARY EMBODIMENT OF INVENTION

The inclined, electric wet-oil treater of the invention is designated generally by the numeral 10 and includes an elongated container or tank 12 which is inclined at an angle to the horizontal in the range of 15° to 60°. The container 12, which is metallic, comprises an elongated cylindrical shell 14 the ends of which are closed by heads 16.

The elongated container 12 provides a water zone 18 at its lower end, an elongated oil zone 20 intermediate its ends, and a gas zone 22 at its upper end, the oil zone being separated from the water and gas zones by large-area interfaces 24 and 26 because of the relatively shallow angle of inclination of the container.

The treater 10 includes water and gas level control means 28 and 30 respectively maintaining a predetermined upper water level in the water zone 18 and a predetermined lower gas level in the gas zone 22. Otherwise expressed, the water level control means 28 prevents the oil-water interface 24 from rising above a predetermined upper level, and the gas level control means 30 prevents the gas-oil interface 26 from falling below a predetermined lower level.

The water level control means 28 is shown simply as comprising a float actuated means 32 for opening a valve 34 in a water outlet line 36 whenever the water level becomes too high. Similarly, the gas level control means 30 includes float actuated means 38 for closing a valve 82 in manifolded oil outlet lines 78 and 80 whenever the upper level of the oil in the oil zone 20 falls too low.

A back pressure valve 40 is disposed in a gas outlet line 42 communicating with the gas zone 22.

A wet-oil inlet tube 44 extends axially into the container 12 through, and is supported by, the head 16 at the upper end thereof. The inlet tube 44 extends axially downwardly within the container 12 into and terminates within the water zone 18. The wet oil to be treated enters the inlet tube 44 at its upper end. The dispersion to be treated may be pumped from storage, or any other suitable source, or it may result from mixing oil from a pump 46 and water or a reagent from a pump 48 in a mixer 50. Such reagent may be a demulsifying agent, or any other desired material.

The inlet tube 44 is provided with port means for discharging the wet oil dispersion or emulsion into the annulus between the inlet tube and the shell 14 of the container 12. Such port means comprises a port 52 on the upper side of the inlet tube 44 within the gas zone 22, any gas which may be present in the dispersion entering the gas zone directly through the port 52. The port means also includes an elongated slot-like port 54 in the upper surface of the inlet tube 44 within and substantially half way between the ends of the oil zone 20. Finally, the port means with which the inlet tube 44 is provided includes an open lower end 56 of the inlet tube within the water zone 18.

The treater 10 further includes a foraminous, cage-like cylindrical electrode 60 encircling the inlet tube 44 intermediate the upper and lower ends of the oil zone 20, the electrode being disposed in the annulus between the inlet tube and the cylindrical shell 14, and being spaced from both of them. The electrode 60 is supported from the cylindrical shell 14 by upper and lower electrode hangers 62 and 64 which insulate the electrode from the container 12. The upper hangers 62 provide electrical connections between the electrode 60 and the secondary of a transformer 66 or other power source. It will be noted that, with the construction illustrated, there are electric fields between the electrode 60 and the inlet tube 44, as well as between the electrode and the cylindrical shell 14, which is an important feature since it provides maximum electric-field exposure of the dispersion being treated.

Upper and lower annular dry-oil collectors 70 and 72 encircle and are carried by the inlet tube 44 within the oil zone 20 and respectively adjacent the upper and lower ends thereof. Also, the upper and lower collectors 70 and 72 are respectively adjacent the upper and lower ends of the cylindrical electrode 60, which is located axially between the two electrodes.

More particularly, the upper and lower collectors 70 and 72 include annular dry-oil collecting chambers 74 and 76 having connected thereto the outlet lines 78 and 80 mentioned earlier, these lines extending through the container shell 14 and then being manifolded together for control by the valve 82.

The annular chambers 74 and 76, which are welded, or otherwise secured, to the inlet tube 44, are formed in part by annular plates 86 and 88 which are spaced outwardly slightly from the inlet tube 44 to provide upper and lower anular dry-oil outlets 90 and 92 bounded by and encircling the inlet tube. The outlets 90 and 92 face each other, the upper outlet 90 facing downwardly along the inlet tube 44, and the lower outlet 92 facing upwardly therealong.

The dry-oil collectors 70 and 72, by partially blocking the annulus between the inlet tube 44 and the container shell 14 adjacent the ends of the oil zone 20, damp any hydraulic disturbances that might tend to be transferred between the water and oil zones 18 and 20, or the oil and gas zones 20 and 22. To achieve optimum damping, the annular plates 86 and 88 preferably have an area of about 5% of the area of the annulus between the inlet tube 44 and the container shell 14.

The narrow annular outlets 90 and 92 adjacent the ends of the cylindrical electrode 60 operate with a skimming action to promote uniform withdrawals of clean oil from the ends of the oil zone, the use of two such outlets at opposite ends requiring all of the effluent oil to pass through the electric fields. For optimum results, the annular outlets 90 and 92 preferably have an area of approximately 1% of the area of the annulus between the inlet tube 44 and the shell 14 of the container 12.

It is thought that the over-all operation of the treater 10 of the invention will be clear from the foregoing description so that no further explanation is required.

Although an exemplary embodiment of the invention has been disclosed herein for purposes of illustration, it will be understood that various changes, modifications and substitutions may be incorporated in such embodiment.

I claim:

1. In an inclined, electric wet-oil treater, the combination of:
    (a) an inclined elongated container providing a water zone at its lower end, an oil zone intermediate its ends and a gas zone at its upper end;
    (b) a wet-oil inlet tube in and extending axially of said container and provided with port means for discharging wet oil into the annulus between said inlet tube and said container;
    (c) a formainous cylindrical electrode in said annulus between said inlet tube and said container and encircling said inlet tube; and
    (d) an annular dry-oil collector within said container and encircling said inlet tube adjacent the upper end of and within said oil zone.

2. An inclined, electric wet-oil treater according to claim 1 including a gas discharge port in said inlet tube and communicating with said gas zone.

3. In an inclined, electric wet-oil treater, the combination of:
    (a) an inclined elongated container providing a water zone at its lower end, an oil zone intermediate its ends and a gas zone at its upper end;
    (b) a wet-oil inlet tube in and extending axially of said container and provided with port means for discharging wet oil into the annulus between said inlet tube and said container;
    (c) a formainous cylindrical electrode in said annulus between said inlet tube and said container and encircling said inlet tube; and
    (d) upper and lower annular dry-oil collectors within said container and encircling and carried by said inlet tube respectively adjacent the upper and lower ends of and within said oil zone.

4. An inclined, electric wet-oil treater as defined in claim 3 wherein said upper and lower annular dry-oil collectors respectively face downwardly and upwardly along said inlet tube, and wherein each provides an annular dry-oil outlet bounded by and encircling said inlet tube.

5. An inclined, electric wet-oil treater according to claim 3 wherein said inlet tube extends downwardly from the upper end of said container into said water zone.

6. An inclined, electric wet-oil treater as set forth in claim 5 wherein said inlet tube has an open lower end in said water zone and wherein said port means includes a port in the upper side of said inlet tube between said annular dry-oil collectors.

7. An inclined, electric wet-oil treater as defined in claim 3 wherein said electrode is between said annular dry-oil collectors.

8. In an inclined, electric wet-oil treater, the combination of:
    (a) an inclined elongated container providing a water zone at its lower end, an oil zone intermediate its ends and a gas zone at its upper ends;
    (b) water and gas level control means respectively maintaining a predetermined upper water level in said water zone and a predetermined lower gas level in said gas zone;

(c) a wet-oil inlet tube extending axially of said container from the upper end thereof into said water zone and provided with port means for discharging wet oil into the annulus between said inlet tube and said container;

(d) said port means including an open lower end of said inlet tube and including a port on the upper side of said inlet tube in said oil zone;

(e) a formainous cylindrical electrode in said annulus between said inlet tube and said container and encircling said inlet tube;

(f) upper and lower annular dry-oil collectors within said container and encircling and carried by said inlet tube respectively adjacent the upper and lower ends of and within said oil zone; and (g) said upper and lower dry-oil collectors respectively facing downwardly and upwardly along said inlet tube and each including an annular dry-oil outlet bounded by and encircling said inlet tube.

References Cited

UNITED STATES PATENTS

| | | | |
|---|---|---|---|
| 1,838,923 | 12/1931 | Fisher | 204—302 |
| 1,838,928 | 12/1931 | Fisher | 204—302X |
| 1,992,133 | 2/1935 | Tarte | 196—46 |
| 2,681,311 | 6/1954 | DeWit | 204—302 |
| 2,963,414 | 12/1960 | Waterman | 204—302 |
| 3,412,002 | 11/1968 | Hubby | 204—302X |

NORMAN YUDKOFF, Primary Examiner

D. EDWARDS, Assistant Examiner

U.S. Cl. X.R.

196—46; 204—188